United States Patent [19]

Pohl et al.

[11] Patent Number: 5,607,594
[45] Date of Patent: Mar. 4, 1997

[54] PROCESS FOR PURIFYING AN AQUEOUS METHYLDIETHANOLAMINE SOLUTION

[75] Inventors: Werner Pohl, Essen; Johannes Menzel, Oberhausen, both of Germany

[73] Assignee: Krupp Koppers GmbH, Essen, Germany

[21] Appl. No.: 523,479

[22] Filed: Sep. 5, 1995

Related U.S. Application Data

[63] Continuation-in-part of Ser. No. 231,018, Apr. 21, 1994, abandoned.

[51] Int. Cl.$^6$ ............................................. C02F 1/42
[52] U.S. Cl. ....................... 210/662; 210/669; 210/677; 210/685; 423/229; 423/242.7; 423/DIG. 14
[58] Field of Search ..................... 210/662, 664, 210/669, 677, 685; 423/228, 229, 242.7, DIG. 14

[56] References Cited

U.S. PATENT DOCUMENTS 2,797,188  6/1957  Taylor ........................................ 196/32
4,347,227  8/1982  Hass et al. ................................. 423/235
4,477,419  10/1984  Pearce et al. ........................... 423/228
5,208,164  5/1993  Cummings ................................ 423/229
5,292,493  3/1994  Audeh ....................................... 423/229

*Primary Examiner*—Cynthia L. Nessler
*Attorney, Agent, or Firm*—Michael J. Striker

[57] ABSTRACT

In the process for purifying an aqueous MDEA-solution the formate content of the MDEA-solution circulated in a main stream between the absorber and desorber of a hydrogen sulfide wash unit for gas produced by gasification of a carbonaceous material, e.g. coal, is measured. A partial stream of MDEA-solution is withdrawn from the main stream, passed over an ion exchange medium which removes some formate present to form a partially purified partial stream and subsequently the purified partial stream is returned to the main stream. The amount of the withdrawal from the main stream is controlled so that the formate content of the main stream is maintained between 10 and 30 g/l. Only from 0.5 to 0.08% by volume need be withdrawn from the main stream to form the partial stream. The ion exchange medium can be regenerated with a hydroxide-containing solution, which is subsequently fed to an ammonia separator column of a hydrogen sulfide wash apparatus.

6 Claims, 2 Drawing Sheets

PROCESS FOR PURIFYING AN AQUEOUS METHYLDIETHANOLAMINE SOLUTION

This is a continuation-in-part of U.S. Pat. application Ser. No. 08/231,018, filed Apr. 21, 1994, and now abandoned.

BACKGROUND OF THE INVENTION

The invention relates to a method of purifying a methyldiethanolamine aqueous solution.

Methyldiethanolamine aqueous solutions are used to remove hydrogen sulfide by absorption from gases, which have been produced by gasification of carbonaceous material, especially fine grained to powdery coal.

The gases of the above-described type contain impurities including particularly ammonia ($NH_3$), hydrogen cyanide (HCN), hydrogen sulfide ($H_2S$) and carbonyl sulfide (COS). Since these impurities disturb further processing or work-up of these gases, they must be removed from these gases in a suitable manner. Several different methods for doing this are already known. Usually the ammonia present in these gases can be nearly completely removed and the hydrogen cyanide and the hydrogen sulfide can be partially removed by washing with a circulating scrubbing or wash liquid. The residual ammonia, the hydrogen cyanide and the hydrogen sulfide are separated subsequently in a separate separating column from the circulating scrubbing or wash liquid. The aqueous solutions of methyldiethanolamine, subsequently the so-called MDEA-solution, have proven particularly suitable for removal of the hydrogen sulfide present in these gases. The hydrogen sulfide is absorbed in the MDEA-solution and can subsequently be separated from the solution containing the impurities.

In practice it has been shown that, as a result of the HCN content present during the course of the process, formate is formed and builds up in the MDEA solution. The formate is formed by hydrolysis of HCN to formic acid and subsequently the formic acid is converted to the amine. However the absorptivity of the MDEA-solution for hydrogen sulfide is generally believed to be impaired by the formate formation.

SUMMARY OF THE INVENTION

Surprisingly it was found that a predetermined enriching formate content of up to 30 g/l in the MDEA-solution had a beneficial effect on the operation of the absorptive scrubbing process for removal of hydrogen sulfide.

A lower residual amount of hydrogen sulfide was found in the scrubbed gas with a formate content of from 5 to 30 g/l in the MDEA-solution than with purer, but still formate-containing, MDEA-solution.

With an increasing formate content in the MDEA-solution however eventually the absorption capacity of the MDEA-solution is reduced because of that and the advantageous effect of the increasing formate content on the absorption properties disappears. Thus it is necessary to keep the formate content below a certain upper limit in an appropriate manner.

Since a considerable formate concentration in the MDEA-solution is desirable for optimum operation of the gas scrubbing for hydrogen sulfide removal, the treatment of the formate-containing MDEA-solution for removal of the formate can be reduced so that there is only a very small partial flow of from 0.5 to 0.08 volume % of the MDEA-solution from the circulated MDEA-solution.

It is an object of the present invention to provide as economical a process as possible of the above-described type for purifying methyldiethanolamine aqueous solution, so that gas scrubbing of a gas generated by gasification of carbonaceous material using the methyldiethanolamine aqueous solution to remove hydrogen sulfide can proceed in an effective manner and so that continuous resupply of fresh MDEA-solution is not necessary.

According to the invention, the method of purifying an MDEA-aqueous solution comprises the steps of:

a) measuring the formate content of a main stream of a methyldiethanolamine solution circulated between the absorber and the desorber of a gas scrubbing apparatus or plant for removing hydrogen sulfide from a gas generated by gasification of a carbonaceous material, particularly fine grained to powdery coal;

b) continuously withdrawing a partial stream of the methyldiethanolamine solution from the main stream;

c) conducting the partial stream withdrawn in step b) with a linear velocity of up to 1 m/h over ion exchange means which combines with the formate present in the partial stream to form a partially purified partial stream to load the ion exchange resin up to a capacity of 30 g formate per 1 of resin;

d) returning the partially purified partial stream to the main stream;

e) controlling the withdrawing of the partial stream in step b) so that the formate content of the main stream is kept between 5 to 30 g/l, advantageously 10 and 30 g/l;

f) rinsing the ion exchange means with demineralized water to form a rinse water solution and subsequently feeding the rinse water solution into the main stream; and g) regenerating the ion exchange means with a hydroxide-containing solution to form a formate-containing solution and conducting the formate-containing solution into the ammonia separator column of the gas scrubbing apparatus.

The formate content is advantageously measured by ion exclusion chromatograph with electrical conductivity detector (e.g. DIONEX ion chromatograph with ICEAS1 column, of DIONEX, Sunnyvale, Calif., 94088-3603).

A basic ion exchange material, particularly a strongly basic anionic ion exchange material such as Lewatit M500 from Bayer AG, 51368 Leverkusen, Germany, is particularly suitable as an ion exchange means for performing the process according to the invention.

So that the purification of the partial flow drawn from the main stream of the methyldiethanolamine solution can occur continuously, advantageously two parallel ion exchange columns are provided, which are alternatively regenerated and charged with the methyldiethanolamine solution to be purified by removing formate.

The withdrawn partial stream is dependent on the HCN-content of the gas to be cleaned and amounts to between 0.08 and 0.5% by volume of the main stream of the MDEA-solution circulated in the gas scrubbing apparatus or plant.

Since the formate-containing solution produced by regeneration of the ion exchange means, e.g. the ion exchange resin or other material, is fed to an ammonia separating column of the gas treatment processing equipment, no special and expensive dumping methods are required for it.

The above steps are thus particularly appropriate, since a solution, advantageously a caustic soda solution, must be added to the waste water for distillative separation of the ammonia from the waste water of the main stream of the aqueous methyldiethanolamine aqueous solution. The formate formed can be destroyed without difficulty in the biological fine purification of the waste water.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
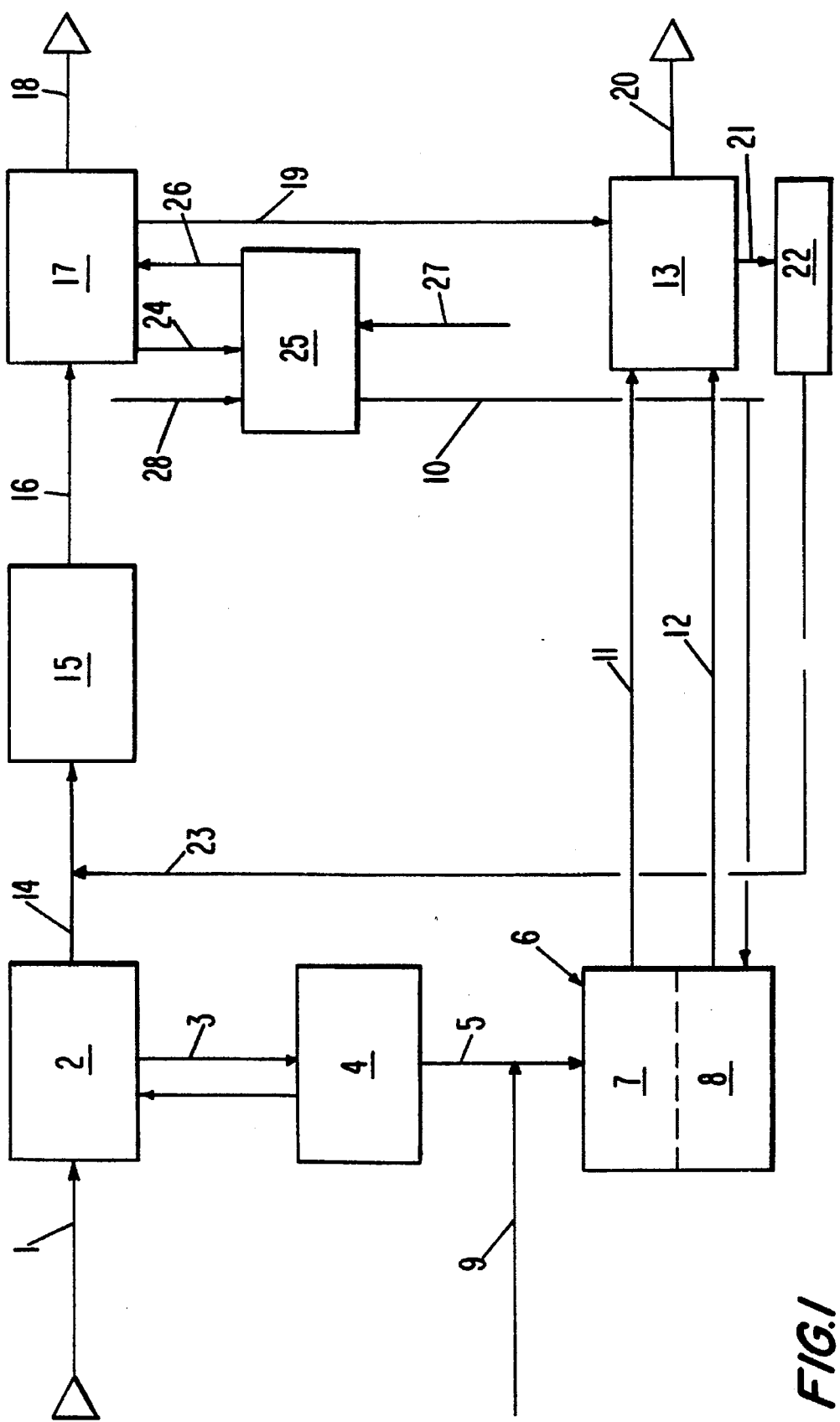
FIG. 1 is a flow chart of one embodiment of a method of purifying an aqueous methyldiethanolamine solution according to the invention coupled with a gas scrubbing process for removing hydrogen sulfide from a gas using the aqueous MDEA solution.

The crude gas from a gasification plant is fed over the pipe 1 into the scrubbing or wash unit 2. The hydrogen sulfide and the hydrogen cyanide are partially washed out of the gas and simultaneously the ammonia is almost completely removed from the gas in the wash unit 2 at a pressure between 15 and 25 bar and a temperature between 110° and 150° C.

The pressure required for performing the gas wash or scrubbing in the wash unit 2 is already predetermined, since the gasification plant connected with it is operated under pressure. Because of the use of comparatively high pressure in the method, the apparatus required for the gas treatment can be suitably small. The required temperatures can normally be adjusted during the cooling of the crude gas occurring in connection with the gasification. A standard gas wash unit, for example one having built-in devices, can be used to perform the gas wash or scrubbing in the gas wash unit 2. The wash water from the gas wash 2 is circulated through a solids separator 4, as shown by the double arrow 3, to free the wash water from dust and/or other solids carried with it, which was removed from the gas in the wash unit 2. The dust carried with the wash water is separated from the wash water in a known way, e.g. by filtration and/or sedimentation, in a solids separator 4. Subsequently the wash water arrives back in the wash unit 2. A smaller partial flow is drawn from the solids separator 4 and fed through the pipe 5 to the two-stage stripper 6 to avoid an undesirable increase of dissolved impurities in the wash water. The amount of the partial flow drawn over the pipe 5 depends on the impurity content, particularly the chlorine content, of the fuel or combustible material used in the gasification. When wash water is drawn from circulation, it is replaced by a corresponding amount of fresh water. In the two-stage stripper 6 back-to-back connected separator 7 operating with acid media and separator 8 operating with basic media are provided.

The acid components are separated from the wash water in the separator 7 operated in acid medium. These components are converted into molecular form according the following reactions:

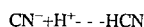

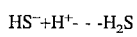

and subsequently by distilling at high temperature. The required acids, such as hydrochloric and sulfuric acid, are fed in a measured amount or rate through the pipe 9 into the partial stream in the pipe 5 flowing to the stripper.

Subsequently the wash water from the separator 7 is conducted into the separator 8. The ammonium ions contained in the wash water are converted by addition of solution to free ammonia by the following reaction

which is similarly distilled away from the wash water by a high temperature distillation.

According to the invention the formate containing solution coming down in the regeneration of the ion exchange material 25 is fed over the pipe 10 into the separator 8. In the event that the amount of the solution fed over pipe 10 is not sufficient, additional free solution, like for example caustic soda solution, can be supplied at a fixed rate.

The treated wash water from the separator 8 can either be fed back into the main stream in the wash unit 2 or it can be fed from the process and to a biological treatment unit. Both possibilities are not shown in the flow chart in the figure. The two-stage stripper 6 comprises a plurality of distillative separator columns in the standard way, in which the required temperature increase for separation of the impurities from the wash water is caused by a sump circulation boiler. The impurities separated from the wash water, i.e. HCN, $H_2S$ and $NH_3$ are fed over the pipes 11 and 12 to a Claus plant 13. In another embodiment not shown in the drawing separate feeds from the separators 7 and 8 are not used, but instead these feeds are combined into a single impurity containing flow and are fed jointly over a pipe to the Claus plant 13.

The gas dedusted and from the gas scrubbing performed in the wash unit 2 is fed over the pipe 14 to the carbonyl sulfide removal unit 15. Here the carbonyl sulfide present in the gas, which is only washed out with difficulty with water or another standard solvent, is converted to hydrogen sulfide by catalytic hydrolysis. Besides the carbonyl sulfide in the gas phase reacts with steam or water vapor according to the following equation:

The catalyst used for this conversion contains aluminum oxide as the active ingredient. Subsequently the gas arrives over the pipe 16 at the hydrogen sulfide wash unit 17, in which the hydrogen sulfide present in the gas is washed out with the MDEA-solution. Thus the hydrogen sulfide present in the gas is removed until the gas has a residual content of about 7 ppm of hydrogen sulfide, while the coabsorption of the remaining gas components is only slight. The treated gas has a sufficient purity after the hydrogen sulfide wash unit 17 and is fed to the combustion chamber of a gas turbine over the pipe 18.

The hydrogen sulfide wash unit 17 comprises an adsorption and a desorption column. The MDEA-solution loaded with impurities is regenerated in the latter by distillative separation of the hydrogen sulfide. Besides a gas flow with a high $H_2S$ concentration results, which arrives over the pipe 19 in the Claus-plant 13. The gas flow from the pipes 11, 12 and 19 are further treated according to a modified Claus process, which also permits the catalytic decomposition of the nitrogen compounds ($NH_3$ and HCN) fed over the pipes 11 and 12.

The elementary sulfur obtained is withdrawn over the pipe 20 in liquid form from the Claus plant 12 and can be fed for further processing or applications. A so-called Claus residual gas always is provided in the Claus plant 13, which contains unconverted sulfur dioxide besides the noncondensed elemental sulfur. Since this Claus residual gas cannot be released into the atmosphere without additional processing because of its pollutant content, it must be subjected to subsequent treatment steps. The Claus residual gas issuing from the Claus plant 13 is thus fed over the pipe 21 of the aftertreament unit 22. The aftertreatment unit 22 performs a catalytic hydrogenation in the embodiment shown in the flow chart.

The resulting sulfur-containing gas is fed back over the pipe 23 and is mixed after a suitable concentration with the gas flow in pipe 14 prior to admission to the carbonyl sulfide removal unit 15.

A partial stream is drawn over the pipe 24 from the MDEA-solution circulated in the hydrogen sulfide wash unit 17 and is fed or passed over the ion exchange medium 25, the ion exchange resin or other ion exchange material, so as to contact it and remove formate from the solution. Subsequently the purified MDEA-solution is fed back over the pipe 26 into the main circulation in the hydrogen sulfide wash unit 17. To avoid loss of MDEA the ion exchange material of the ion exchange means 25 subsequently is rinsed with demineralized water, which is fed over the pipe 27 to form a rinse water solution. After passing over the ion exchange medium 25 the rinse water solution arrives over the pipe 26 in the hydrogen sulfide wash unit 17 and balances the water losses occurring during the hydrogen sulfide desorption. The potash solution required for the regeneration of the ion exchange material is supplied over the pipe 28. The formate containing solution coming down in the regeneration, as has already been described, is drawn over the pipe 10 and fed into the separator 8.

Figure 2:
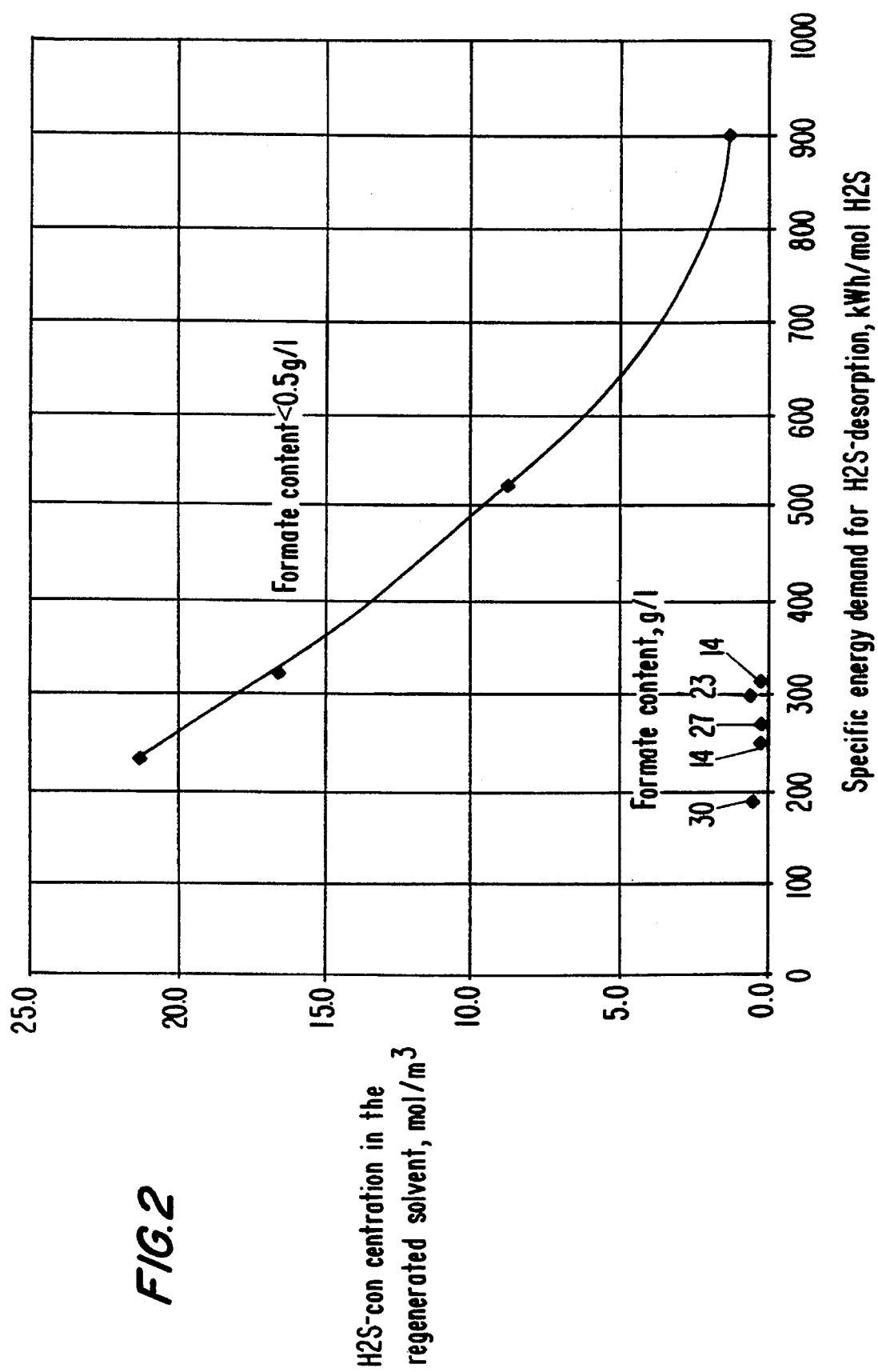
FIG. 2 is a graphical illustration of the relationship between hydrogen sulfide concentration in the regenerated solvent versus the specific energy required for hydrogen sulfide desorption for various formate contents.

FIG. 2 shows pilot plant data which prove that the separation of hydrogen sulfide from the gas generated by gasification of carbonaceous material is optimized by controlling the formate content of the wash liquid so that it is between 5 and 30 g/l, advantageously 10 and 30 g/l. The formate content was measured by ion chromatography using a DIONEX Type 2010 ion chromatograph (DIONEX, Sunnyvale, Calif. 94088-3603), equipped with an ion chromatography exclusion column ICEAS1 and an electrical conductivity detector. The pilot plant includes a $H_2S$ absorption column of about 9 m in height and a desorption column. A main stream of wash liquid of 1 $m^3$/h was circulated between the columns and $H_2S$ was absorbed from the gas stream of about 1800 $m^3$/h (referred to standard state: 1.013 bar, 273.15K) at 22 bar and 20° C. in the absorption column and desorbed from the loaded main stream in the desorption column. The gas composition on a dry basis was as follows: carbon monoxide, 60% by volume; hydrogen, 35% by volume; carbon dioxide, 2% by volume; hydrogen sulfide, 0.2% by volume; hydrogen cyanide, 100 Vppm; ammonia, 5 Vppm; and carbonyl sulfide, 200 Vppm. The wash liquid was a 42% aqueous MDEA solution which was delivered to the absorption column at 30° C. The hydrogen sulfide was removed from the solution in the desorption column by stripping it away from the loaded main stream with steam.

The graphical illustration in FIG. 2 shows the relationship between hydrogen sulfide residual content in mol/$m^3$ in the regenerated solvent from the desorption column to specific energy required for hydrogen sulfide desorption in kWh/mol of $H_2S$, for wash liquids with different formate concentrations. The data used to obtain FIG. 2 are tabulate in the following Table I.

TABLE I

RELATIONSHIP OF ENERGY REQUIRED FOR $H_2S$ DESORPTION AND FORMATE CONTENT IN AQUEOUS MDEA SOLUTIONS

| $H_2S$-content, | formate content, | specific energy required |
|---|---|---|
| mol/$m^3$ | g/l | for $H_2S$ desorption, kWh/mol |
| 1.4 | <0.5 | 900.9 |
| 8.8 | <0.5 | 521.4 |
| 16.6 | <0.5 | 324.1 |
| 21.3 | <0.5 | 231.6 |
| 0.2 | 14 | 317.7 |
| 0.2 | 14 | 271.9 |
| 0.5 | 23 | 300.1 |
| 0.2 | 27 | 251.1 |
| 0.5 | 30 | 189.6 |

FIG. 2 shows the results in Table I graphically. When the aqueous MDEA solution is comparatively fresh and has comparatively little formate (<0.5 g/l) a considerably higher specific energy is required to remove a predetermined amount of hydrogen sulfide than when the aqueous MDEA solution contains from 5 to 30 g/l of formate. As shown by the four data points in FIG. 2 for the solution with formate content less than 0.5 g/l, more specific energy is required to remove more hydrogen sulfide.

The attainable hydrogen sulfide residual content in the purified gas is limited by the purity of the wash liquid fed to the top of the absorption column. Because of thermodynamic relationships between gas and liquid phases, the less the residual hydrogen sulfide content is in the regenerated wash liquid fed to the adsorption column, the lower the hydrogen sulfide content attainable in the gas. Of course then the less the hydrogen sulfide content in the regenerated wash liquid is, the greater the specific energy required. That effect is shown by the decreasing solid curve toward higher specific energy in FIG. 2 for nearly formate-free aqueous MDEA solution.

The specific energy required for complete regeneration of wash liquid for solutions having a formal content of less than 0.5 g/l formate is more than 900 kWh/mol of hydrogen sulfide, while only 200 to 300 kWh/mol $H_2S$ is required when the formate content is within the range prescribed by the invention, from 5 to 30 g/l, or advantageously from 10 to 30 g/l. The purity of the regenerated aqueous MDEA solution is at least 20, and about 30, times poorer when only 200 to 300 kWh/mol $H_2S$ is input. The hydrogen sulfide content in the regenerated wash liquid is from 15 to 20 mol/$m^3$ of $H_2S$ when the specific energy required is from 200 to 300 kWh/mol $H_2S$.

Since the residual hydrogen sulfide concentration in the product gas produced by the scrubbing process is less than 5 ppm for all entries in Table I, the concentration of hydrogen sulfide in the product gas was not measured due to experimental difficulties. The residual hydrogen sulfide concentration in the product gas at levels ≧5 ppm was measured by the lead acetate reaction method (comparable to ASTM D4084) using an analyzer manufactured by MAIHAK, Hamburg, Germany. The higher hydrogen sulfide concentration in the gas entering the absorption column was measured by gas chromatography using a thermal conductivity detector.

While the invention has been illustrated and described as embodied in a method of purifying an aqueous methyldiethanolamine solution, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of purifying an aqueous methyldiethanolamine solution, said method comprising the steps of:

a) measuring a formate content of a main stream of an aqueous methyldiethanolamine solution, said aqueous methyldiethanolamine solution being circulated between an absorbing means for absorbing hydrogen sulfide into the main stream from a hydrogen sulfide-containing gas and desorbing means for desorbing said hydrogen sulfide from said main stream, said hydrogen sulfide-containing gas being generated by gasification of a carbonaceous material;

b) continuously withdrawing a partial stream of said methyldiethanolamine solution from said main stream;

c) conducting the partial stream withdrawn from the main stream in step b) at a linear velocity of up to 1 m/h over ion exchange means for combining with formate present in said partial stream to form a partially purified partial stream to load the ion exchange resin up to a capacity of 30 g formate per liter of said ion exchange resin;

d) returning the partially purified partial stream formed in step c) to said main stream;

e) controlling the withdrawing of the partial stream in step b) so that the formate content of the main stream is maintained between about 14 and about 30 g/l;

f) rinsing said ion exchange means with demineralized water to form a rinse water solution and subsequently feeding the rinse water solution into said main stream; and g) regenerating said ion exchange means with a hydroxide-containing solution to form a formate-containing solution and conducting the formate-containing solution into an ammonia separator column.

2. The method as defined in claim 1, wherein said ion exchange means comprises a basic anionic ion exchange material.

3. The method as defined in claim 1, further comprising providing two ion exchange means connected in parallel and alternately feeding said methyldiethanolamine solution to be purified through one of said two ion exchange means while regenerating the other of said two ion exchange means.

4. The method as defined in claim 1, wherein said partial flow drawn from said main stream amounts to between 0.08 and 0.5% by volume of said main stream of said methyldiethanolamine solution.

5. The method as defined in claim 1, wherein said carbonaceous material is fine grained to powdery coal.

6. The method as defined in claim 1, wherein said formate content of said main stream is measured by ion exclusion chromatography using an electrical conductivity detector.

* * * * *